Patented Aug. 26, 1952

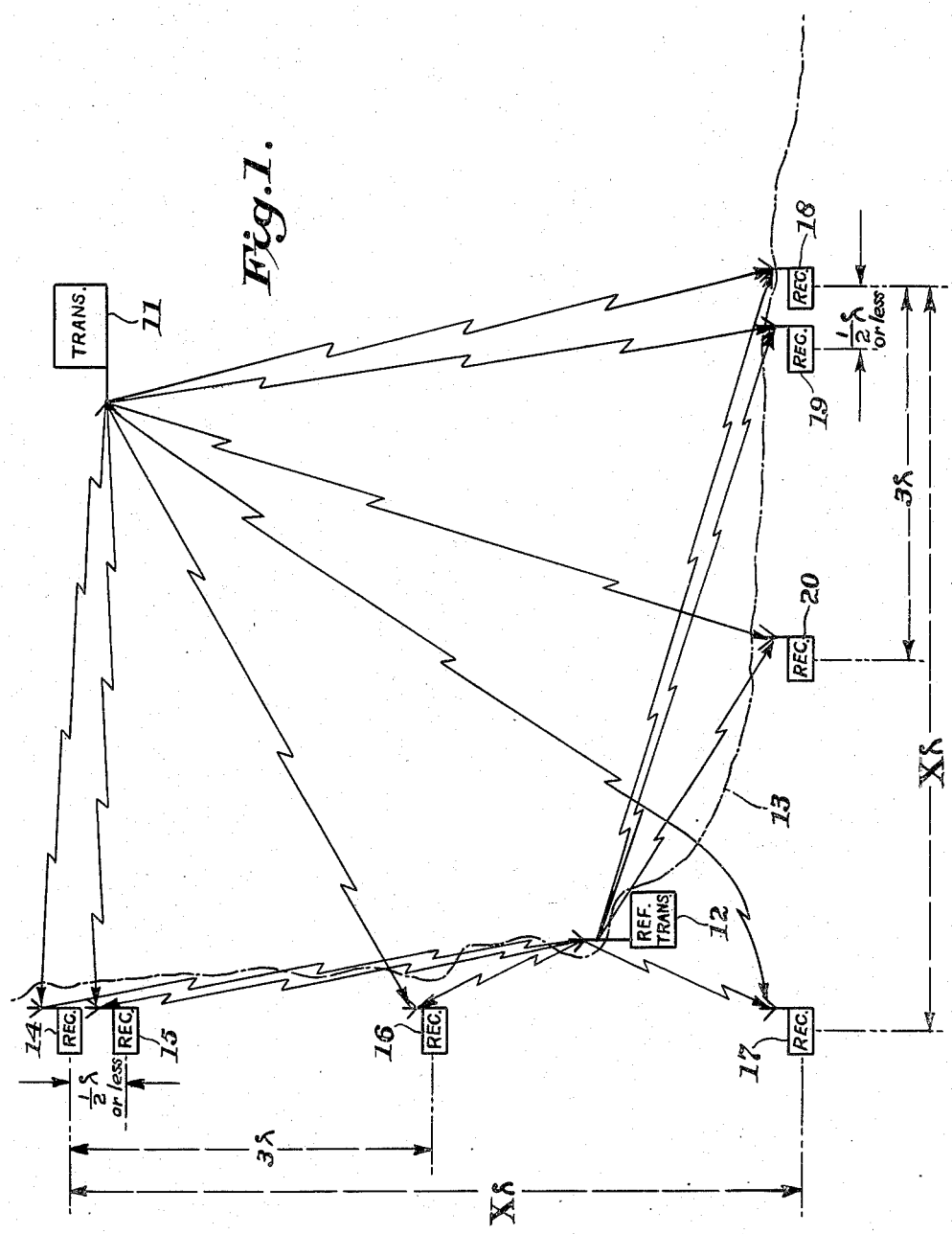

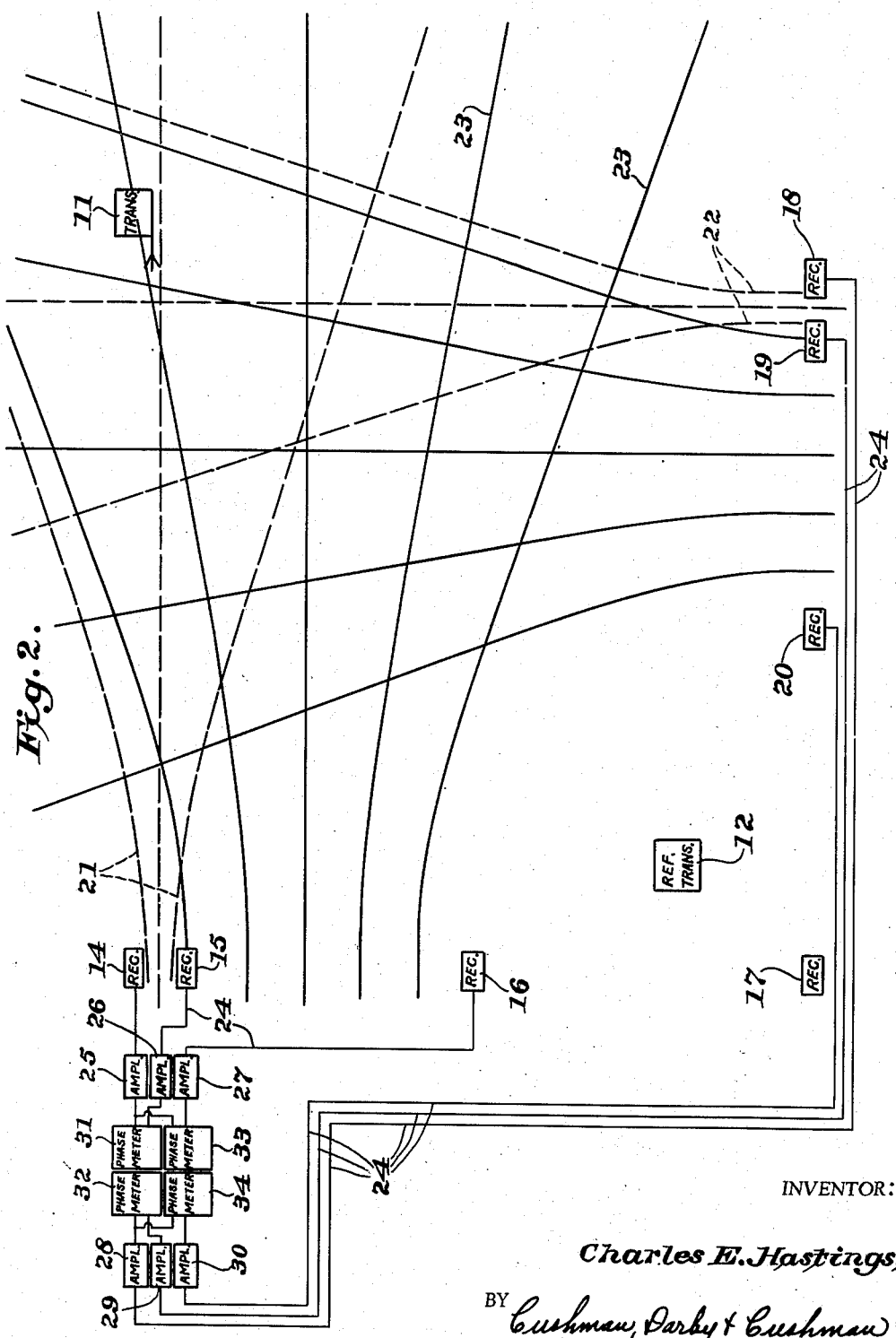

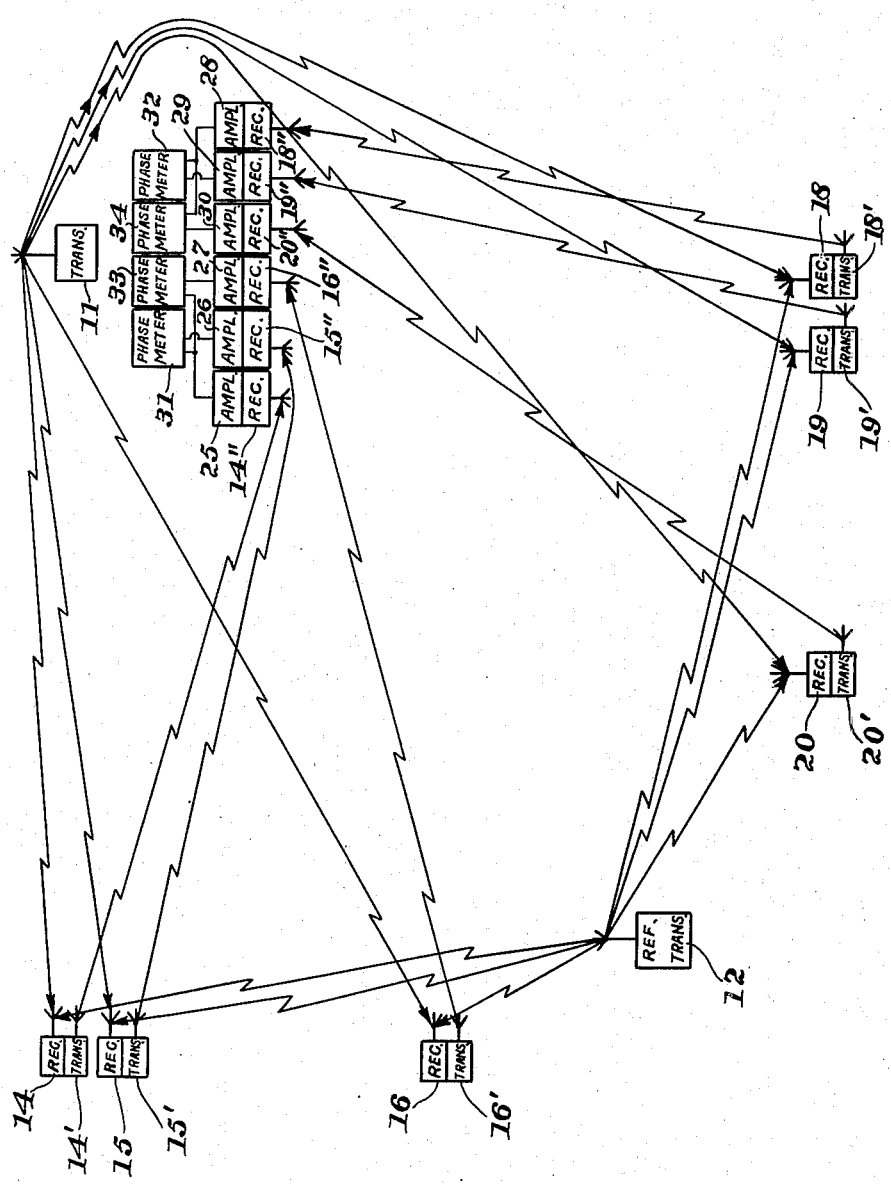

2,608,685

UNITED STATES PATENT OFFICE 2,608,685

RADIO NAVIGATION SYSTEM

Charles E. Hastings, Hampton, Va., assignor to Hastings Instrument Company, Inc., Hampton, Va., a corporation of Virginia Application December 29, 1949, Serial No. 135,596

10 Claims. (Cl. 343—105)

This invention relates to a navigation system and method operable on the principle of phase comparison of the beat frequency between the signals of a pair of transmitters as detected at spaced points.

It is an object of the present invention to provide a navigation system and method capable of determining position with an extremely high degree of accuracy.

It is a further object of this invention to provide a navigation system and method capable of determining position substantially instantaneously, without regard to previous knowledge of position or tracking.

A further object is to provide a navigation system and method employing standard radio communication units.

Another object is to provide a system and method for determining the position of a mobile object either at the object or at a fixed station, the latter alternative requiring a single transmitter and no other equipment on the moving object.

Further objects will be in part obvious and in part pointed out hereinafter.

The invention and the novel features thereof may best be made clear from the following description and the accompanying drawings, in which:

Figure 1 is a block diagram illustrating an exemplary embodiment of the invention, showing the basic radio communication units employed therein;

Figure 2 is a diagram corresponding generally to Figure 1, illustrating one mode of operation of the system, and Figure 3 is a block diagram illustrating an alternative embodiment of the invention, adapted to determine position of a mobile transmitter at the mobile position.

Referring to the drawings, in Figure 1 is shown a mobile transmitter 11, which may be carried on a ship, aircraft or other mobile object, adapted to transmit at a fixed frequency. The mobile transmitter 11, it will be understood, represents merely a transmitter of unknown position, and need not necessarily be moving nor even movable. In conjunction with the mobile transmitter is employed a stationary reference transmitter 12, located at any convenient fixed position within range of the receivers. If the mobile transmitter be operated over water, the reference transmitter may conveniently be located at a suitable point on land, for example near shore line 13. Reference transmitter 12 is also adapted to transmit at a fixed frequency, and is tuned to transmit at a different frequency from that of transmitter 11. The frequency difference, preferably, is within the audio range, a difference of 400 cycles for example being entirely satisfactory, whereby the system need utilize but a single assigned radio frequency channel. A receiver adapted to receive both transmissions and detect the beat frequency therebetween will obviously detect the same beat frequency wherever located. However, it will be recognized that the phase of the detected beat frequency signal will vary with the position of the receiver. It should be noted that the effect of frequency drift in either transmitter is cancelled out, whereby ordinary equipment may be utilized without any loss of accuracy.

By measuring the phase difference between beat frequency signals detected by two spaced-apart receivers, a hyperbolic line of position of the mobile transmitter relative to the two receivers may be determined. Further, the greater the spacing between the receivers, the greater will be the accuracy with which the line of position may be determined.

To accomplish this end, beat frequency signals detected by a pair of fixed, spaced receivers may be relayed to a common point, and there amplified and fed to a conventional phase meter adapted to indicate the phase difference therebetween. The reference transmitter being stationary, the phase difference so determined will vary with difference in distance between the mobile transmitter on the one hand and each of the receivers on the other. So long as the difference in distance between the mobile transmitter and the two receivers remains the same, the phase difference between the detected signals will not vary. Accordingly, it follows that if the mobile transmitter moves along a hyperbolic path having the receivers as focal points, no change in phase difference will be effected, while if the transmitter moves laterally relative to such a path, a corresponding change in phase difference will take place.

Accordingly, the phase difference indicated by the phase meter will be indicative of the position of the mobile transmitter with respect to a family of hyperbolas having the receivers as focal points. Using conventional transmission frequencies and a distance between receivers consonant with great accuracy, the distance between receivers will be great relative to the wave length of transmission, and the family of hyperbolas will constitute a plurality of sectors or lanes each defined by hyperbolic lines spaced one-half wave length apart where they intersect a straight base line drawn between the receivers. Traverse of a lane so defined by the mobile transmitter will change the differential distance between the transmitter and the receivers one wave length, thereby effecting a 360° change in phase difference as indicated by a phase meter. It follows that if the zero position of the phase meter is adjusted to correspond to position of the mobile transmitter on one of the lane-defining lines, the phase meter reading will directly indicate a line of position within a lane, although it will not identify the lane wherein the transmitter lies.

If two receivers are located at positions spaced apart a distance not exceeding one-half the mobile transmitter wave length, the problem of lane identification does not arise, since the entire possible range of movement of the mobile transmitter results in a change in phase difference not exceeding one cycle, or not exceeding 360° as recorded by the phase meter. In this case, then, the phase meter reading indicates a hyperbolic line of position relative to the receivers which may be readily established. The line of position so established is insufficiently accurate to indicate position with precision, but it is an outstanding feature of the present invention to employ two receivers so spaced to determine rough position of the mobile transmitter and obviate thereby the problem of lane identification.

In Figure 1 is shown an exemplary embodiment of the system of the present invention, including a group of receivers 14, 15, 16 and 17, receivers 14 and 15 being spaced apart a distance not exceeding one-half the mobile transmitter wave length, and receivers 16 and 17 being spaced from receiver 14 at progressively greater distances. In conjunction with the first group of receivers is employed a differently positioned group of receivers 18, 19 and 20, preferably disposed on base lines angulated relative to the base lines of the first group. Of the second group, receivers 18 and 19 are spaced a distance not exceeding half the wave length of transmission, and receivers 18 and 20 a greater distance. Receivers 18 and 17 may be employed as a pair of this group spaced an even greater distance apart.

Referring to Figure 2, assuming a position of mobile transmitter 11 as indicated, it will be readily understood that the lines of position of the mobile transmitter may be readily established with respect to receiver pair 14—15 and receiver pair 18—19. That is, the phase difference between the beat frequencies detected by receivers 14 and 15 will be indicative of the position of transmitter 11 with respect to a family of hyperbolic lines illustrated in the drawing as dotted lines 21, these lines having receivers 14 and 15 as focal points. Similarly, the phase difference between the beat frequencies detected by receivers 18 and 19 will indicate the position of transmitter 11 relative to a similar family of hyperbolic lines illustrated as dotted lines 22. The receivers all being fixed in position, the families of hyperbolic lines may be previously established and identified with phase meter readings, and employed as an overlay with a map of the area, whereby the phase meter readings may be easily converted into lines of position. In this manner, the phase meter readings indicating difference in phase between the beat frequency signals detected by receiver pairs 14—15 and 18—19 may be utilized to identify two rough lines of positions, whose intersection represents the rough position of the mobile transmitter.

Employing next receivers 14 and 16 and determining the phase difference between the signals detected thereby, a line of position of the mobile transmitter may be determined with much greater accuracy. In the example shown, receivers 14 and 16 are spaced apart three wave lengths, whereby six lanes of position are established therebetween, the lanes being separated by imaginary hyperbolic lines 23, having receivers 14 and 16 as focal points and separated one-half wave length where they intersect the base line extending between the receivers. Accordingly, movement of the mobile transmitter from one line 23 to the next on either side will effect a change of 360° in the phase difference between the beat frequencies detected by receivers 14 and 16, and will effect a corresponding complete revolution of the phase meter. If the phase meter be zeroed to correspond to the lines of lane demarkation, the meter will indicate directly hyperbolic lines of position intermediate the lines of lane demarkation with great accuracy.

As in the previous case, a plot may be previously established indicating the lines of lane demarkation relative to the receivers, and a plurality of intermediate lines of position in each lane. Employing this plot as an overlay, the rough position of the transmitter as established by receiver pairs 14—15 and 18—19 will immediately identify the lane in which the transmitter is positioned. The lane being thus identified, the phase difference between the signals detected by receivers 14 and 16 may be utilized with the plot to establish the line of position of the transmitter with great accuracy. Similarly, employing receivers 18 and 20 another line of position of transmitter 11 may be determined with corresponding accuracy, the problem of lane identification being again obviated by the rough position of the transmitter previously determined. The intersection of the lines of position indicated by the receiver pairs 14—16 and 18—20, then, will establish the fine position of the mobile transmitter with great accuracy.

If even greater accuracy is required, of the order say of a few feet or inches, two receiver pairs each spaced apart much greater distances may be similarly employed. In the embodiment shown, for example, receivers 14 and 17 may be employed as one widely spaced pair, and receivers 18 and 17 as the other. Again using a proper plot indicating the lines of lane demarkation between these receiver pairs and intermediate lines of position in each lane, the lane of position of the transmitter relative to the receiver pairs is indicated by the transmitter position already determined, and the phase differences between the signals detected by the receiver pairs may be translated into lines of position establishing the position of the transmitter with exceedingly great accuracy, within a margin of error of the order of a few inches, if desired. Obviously, the greater the distance between receivers of the receiver pairs employed in the final step, the more exact will be the final position determination.

Since the receivers are employed in pairs, it will be apparent that the receivers of each group need not be arranged in line, nor need the groups be disposed at a right angle or any other angle relative to each other, it being necessary only that the two pairs being used together to establish a position be differently located relative to each other.

The position determination outlined above may be made within a very short time, a matter of a few seconds or less. In the system of Figure 2, for example, the signals detected by receivers 14, 15, 16, 18, 19 and 20 may be relayed to a common station located adjacent one of the receivers or at any other convenient point, as by telephone lines 24, cables, or radio links, to amplifiers 25, 26, 27, 28, 29 and 30 respectively. It is often desirable that these amplifiers be matched and of a constant output type. The output of amplifiers 25 and 26 may be supplied to a conventional phase meter 31, whose reading will indicate a rough line of position of the mobile transmitter relative to the receiver pair 14—15. Similarly, the output of amplifiers 28 and 29 may be supplied to phase meter 32, whose reading will indicate another rough line of position of the mobile transmitter relative to the receiver pair 18—19. The output of amplifiers 25 and 27 may be supplied to a phase meter 33, and the output of amplifiers 28 and 30 to a phase meter 34. In this manner, on a proper plot of the area previously established relative to the fixed position of the receivers, phase meters 29 and 30 will indicate rough lines of position, establishing the rough position of the mobile transmitter. The rough position so determined immediately establishes the lane position of the transmitter relative to the receiver pairs 14—16 and 18—20, and the phase meters 33 and 34 will indicate lines of position in those lanes by which the position of the transmitter may be established with greater accuracy. As previously indicated, if accuracy of the highest order is required, the receiver pairs 14—17 and 18—17 may be employed, utilizing another pair of amplifiers and another pair of phase meters, and a plot indicating the narrower lanes of position corresponding to the greater spacing between receivers of the receiver pairs. Obviously, the position information so determined may be radioed to the moving object by voice or code, if desired.

As indicated above, the signals detected by the various receivers may be transmitted to a common point by AM or FM radio links, if desired. Such an expedient is employed in the alternative embodiment illustrated in Figure 3, wherein the position determining phase meters are associated with the mobile transmitter. In this modification, the signal detected by each of the receivers is fed to an associated transmitter, similarly numbered and primed, by which each beat frequency signal detected may be transmitted to a receiver at the position of the mobile transmitter, the latter receivers being correspondingly numbered and double primed. The signals so detected, transmitted and received may be fed through the amplifiers in the manner previously described to the phase meters 31, 32, 33 and 34, and the rough and fine position of the mobile transmitter derived therefrom in identical manner.

The foregoing relates to a two-dimensional navigation system and method. It will be apparent that if the transmission frequencies employed are such as to render it feasible, the system may be extended to three dimensions by arranging receiver pairs vertically or angularly relative to the ground. By employing a tunable reference transmitter, emissions from an unidentified object may be heterodyned, and the position of the object determined with great speed and accuracy.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. Apparatus of the class described comprising two spaced transmitters adapted to transmit at different frequencies, a plurality of receivers adapted to detect the beat frequency between the emissions of said transmitters, one pair of said receivers being spaced apart a distance not exceeding half the wave length of said emissions, another pair of said receivers being spaced apart a greater distance, and means for indicating the difference in phase between the beat frequencies detected by said receiver pairs.

2. Apparatus of the class described comprising a mobile transmitter and a fixed transmitter adapted to transmit at frequencies differing by an audio note, a plurality of fixed receivers adapted to detect the beat frequency between the emissions of said transmitters, one pair of said receivers being spaced apart a distance not exceeding half the wave length of said mobile transmitter, another pair of said receivers being spaced apart a greater distance, and means for indicating the difference in phase between the beat frequencies detected by each of said receiver pairs.

3. Apparatus of the class described comprising a mobile transmitter and a fixed transmitter, said transmitters being adapted to transmit at frequencies differing by an audio note, three fixed receivers each adapted to detect the beat frequency between the emissions of said transmitters, the second of said receivers being spaced from the first receiver a distance not exceeding half the wave length of said mobile transmitter and the third receiver being spaced from the first receiver a greater distance, means for indicating the difference in phase between the beat frequencies detected by said first and second receivers, and means for indicating the difference in phase between the beat frequencies detected by said first and third receivers.

4. Apparatus according to claim 3, wherein said phase difference indicating means are located in the vicinity of one of said receivers.

5. Apparatus according to claim 3, wherein said phase difference indicating means are mobile with said mobile transmitter.

6. Apparatus of the class described comprising a mobile transmitter and a fixed transmitter adapted to transmit at different frequencies, a plurality of fixed receivers each adapted to detect the beat frequency between the emissions of said transmitters, one pair of said receivers being spaced apart a distance not exceeding half the wave length of said mobile transmitter, other pairs of said receivers being spaced apart greater but different distances, and means for indicating the difference in phase between the beat frequencies detected by each of said receiver pairs.

7. Apparatus of the class described comprising a mobile transmitter and a fixed transmitter adapted to transmit at frequencies differing by an audio note, a plurality of fixed receivers each adapted to detect the beat frequency between the emissions of said transmitters, one pair of said receivers being spaced apart a distance not exceeding half the wave length of said mobile transmitter, another pair of said receivers being spaced apart a greater distance, means for relaying the beat frequencies so detected to a common point, means for equalizing the output of said receivers at said common point, and means at said common point for indicating the difference in phase between the beat frequencies detected by each of said receiver pairs.

8. Apparatus of the class described comprising a mobile transmitter and a fixed transmitter adapted to transmit at different frequencies, a first group of receivers each adapted to detect the beat frequency between the emissions of said transmitters, a second group of receivers each adapted to detect the beat frequency between the emissions of said transmitters, said groups being differently positioned relative to said transmitters, one pair of receivers of each group being spaced apart a distance not exceeding half the wave length of said mobile transmitter, another pair of receivers of each group being spaced apart a greater distance, and means for indicating the difference in phase between each of said receiver pairs.

9. Apparatus of the class described comprising a mobile transmitter and a fixed transmitter, said transmitters being adapted to transmit at frequencies differing by an audio note, a first group of fixed receivers each adapted to detect the beat frequency between the emissions of said transmitters, a second group of fixed receivers each adapted to detect the beat frequency between the emissions of said transmitters, said groups being angularly positioned relative to said mobile transmitter, one pair of receivers of each group being spaced apart a distance not exceeding half the wave length of said mobile transmitter, another pair of receivers of each group being spaced apart a greater distance, and means for indicating the difference in phase between each of said receiver pairs.

10. Apparatus of the class described comprising two spaced transmitters tuned to transmit different frequencies, a plurality of receivers adapted to detect the beat frequency between the emissions of said transmitters, one pair of receivers being spaced apart a first distance and another pair of receivers being spaced apart a greater distance, means for indicating a difference in phase between the beat frequency detected by each of said receiver pairs, the said first distance being sufficiently limited so that the phase relationship of the beat frequencies as detected by said first pair of receivers provides a position without ambiguity over a known range of movement of one of said transmitters, whereby the indicated phase relationship of the beat frequencies as detected by the second pair of receivers may be construed without ambiguity.

CHARLES E. HASTINGS.

REFERENCES CITED

The following references are of record in the file of this patent:

UNITED STATES PATENTS

| Number | Name | Date |
| --- | --- | --- |
| 1,406,996 | Morrill | Feb. 21, 1922 |
| 2,144,203 | Shanklin | Jan. 17, 1939 |
| 2,148,267 | Hanore | Feb. 21, 1939 |
| 2,513,316 | Hawkins | July 4, 1950 |